(12) United States Patent
Lan

(10) Patent No.: US 6,196,516 B1
(45) Date of Patent: Mar. 6, 2001

(54) CUSHIONING DEVICE FOR A COMPUTER COMPONENT

(75) Inventor: Hao-Jui Lan, Taipei (TW)

(73) Assignee: Mitac International Corp, Hsinchu (TW)

( * ) Notice: Subject to any disclaimer, the term of this patent is extended or adjusted under 35 U.S.C. 154(b) by 0 days.

(21) Appl. No.: 09/390,560

(22) Filed: Sep. 3, 1999

(51) Int. Cl.$^7$ .................................................. F16M 13/00
(52) U.S. Cl. ................................................ 248/634; 248/615
(58) Field of Search ........................................ 248/560, 615, 248/614, 634, 635; 361/685

(56) References Cited

U.S. PATENT DOCUMENTS

| | | | |
|---|---|---|---|
| 2,685,178 | * | 8/1954 | Eck ........................................ 248/635 |
| 5,051,075 | * | 3/1996 | Spies ...................................... 248/635 |
| 5,142,447 | * | 8/1992 | Cooke ..................................... 361/685 |
| 5,751,551 | * | 5/1998 | Hileman ................................. 248/634 |

FOREIGN PATENT DOCUMENTS

| | | | | |
|---|---|---|---|---|
| 844598 | * | 7/1952 | (DE) ....................................... 248/635 |
| 2519745 | * | 7/1983 | (FR) ....................................... 248/635 |

* cited by examiner

*Primary Examiner*—Alvin Chin-Shue
(74) *Attorney, Agent, or Firm*—Ladas & Parry

(57) ABSTRACT

A cushioning device includes a support frame having right and left anchoring walls adapted to be secured to the right and left side walls of a computer component, respectively. At least one of the right and left anchoring walls has an inserting through hole. An impact absorbing member is made of an elastomeric material, and has a first annular flange and a second annular flange. The impact absorbing member is inserted into the inserting through hole with a portion of the anchoring wall around the inserting through hole being interposed between the first annular flange and the second annular flange. A fastening member passes through a fastening through hole in the impact absorbing member for fastening the support frame onto one of the side walls of the computer component.

3 Claims, 3 Drawing Sheets

CUSHIONING DEVICE FOR A COMPUTER COMPONENT

BACKGROUND OF THE INVENTION

1. Field of the Invention

The present invention relates to a cushioning device for a computer component, more particularly to one for mounting a hard disk drive onto a base body of a computer.

2. Description of the Related Art

As personal computers grow in popularity for family and business applications, the performance requirements for hard disk drives are getting more and more strict due to the vital role of the hard disk drive in a computer. Any failure of the hard disk drive would hinder proper operation of the computer. Apart from expansion of the memory capacity of the hard disk drive, the quality and reliability thereof are also the primary concerns in the computer industry. The quality and reliability requirements of a hard disk drive are even more strict in a notebook computer in view of the delicacy and portability of the latter.

FIG. 1 shows a conventional hard disk drive assembly 10 used in a computer (not shown), which includes a hard disk drive 12 and a support frame 14. The hard disk drive 12 is mounted on the support frame 14 by means of screws 16. The hard disk drive assembly 10 is then mounted onto a base body of the computer (not shown) by mechanical fastening means, such as screws, provided between the computer and the support frame 14. Such an arrangement is inherent of some disadvantages as follows:

1. The hard disk drive is easily impaired.

Since the conventional hard disk drive is mounted directly on a support frame which, in turn, is mounted on a computer, any external impact applied on the computer is easily transmitted to the hard disk drive and might result in the damage to the hard disk drive, and in failure of the computer. Damages of this kind become much worse in a notebook computer due to the high portability of the latter.

2. The hard disk drive is expensive.

In order to avoid damages caused by an external impact, the quality of the hard disk drive must be improved. Such an approach, however, increases the manufacturing cost of the hard disk drive and is not considered to be a good solution to this problem.

SUMMARY OF THE INVENTION

Therefore, the object of the present invention is to provide a cushioning device for mounting a hard disk drive onto a computer. The cushioning device is inexpensive, impact-resistant, and wear-resistant, and can prevent damages to the hard disk drive in the event of an external impact.

Accordingly, the cushioning device of this invention includes: a support frame having right and left anchoring walls which are spaced apart and which are adapted to be secured to right and left side walls of a computer component, respectively, at least one of the right and left anchoring walls having an inserting through hole; an impact absorbing member made of an elastomeric material and having a first annular flange and a second annular flange, the impact absorbing member being inserted into the inserting through hole with a portion of the anchoring wall around the inserting through hole being interposed between the first annular flange and the second annular flange; and a fastening member passing through a fastening through hole provided axially in the impact absorbing member for fastening the support frame onto one of the side walls of the computer component.

BRIEF DESCRIPTION OF THE DRAWINGS

The features and advantages of the present invention will be described in more detail with reference to the accompanying drawings which illustrate the preferred embodiment of this invention, wherein.

DETAILED DESCRIPTION OF THE PREFERRED EMBODIMENT

Figure 1:
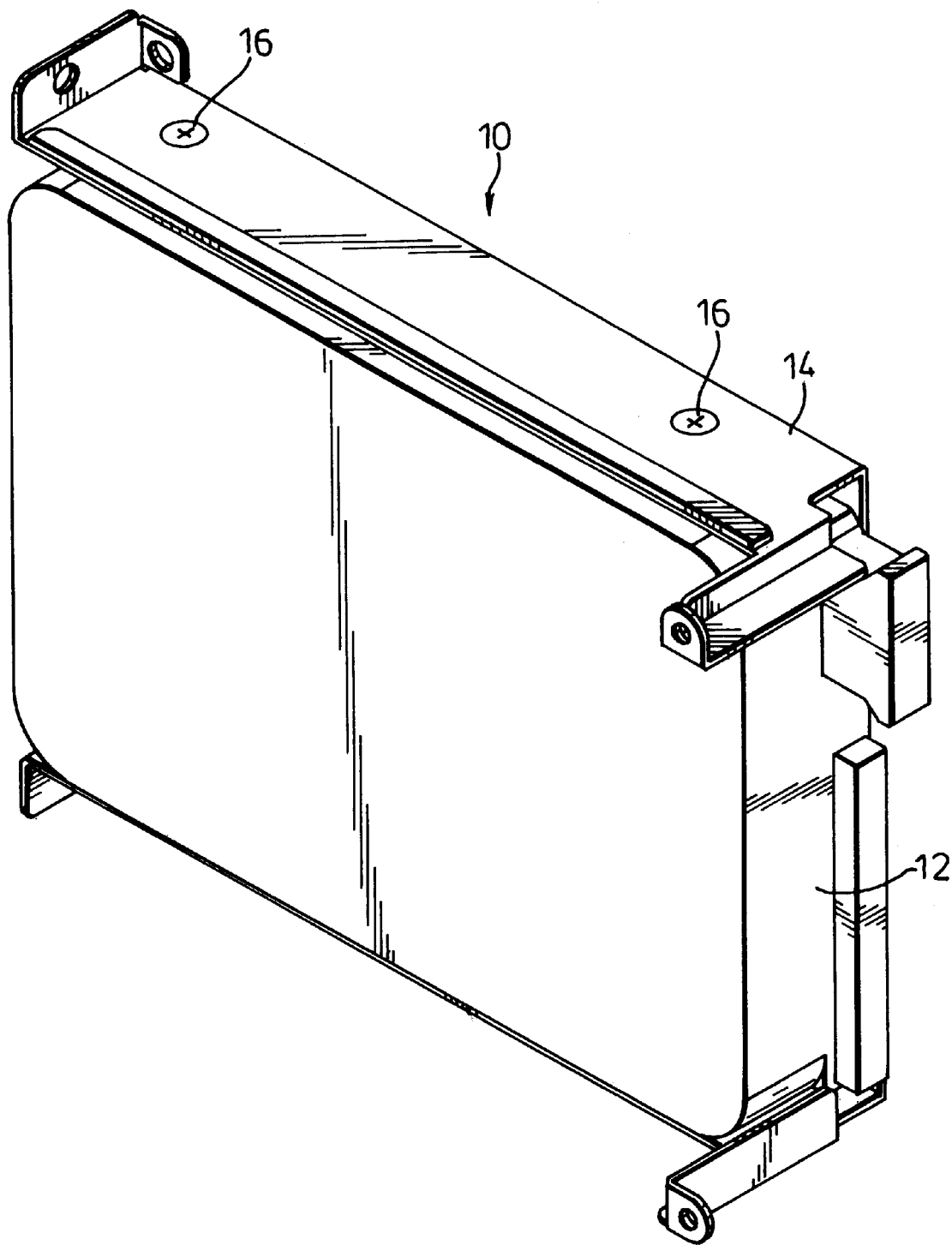
FIG. 1 is a perspective view of a conventional hard disk drive assembly used in a notebook computer.
Figure 2:
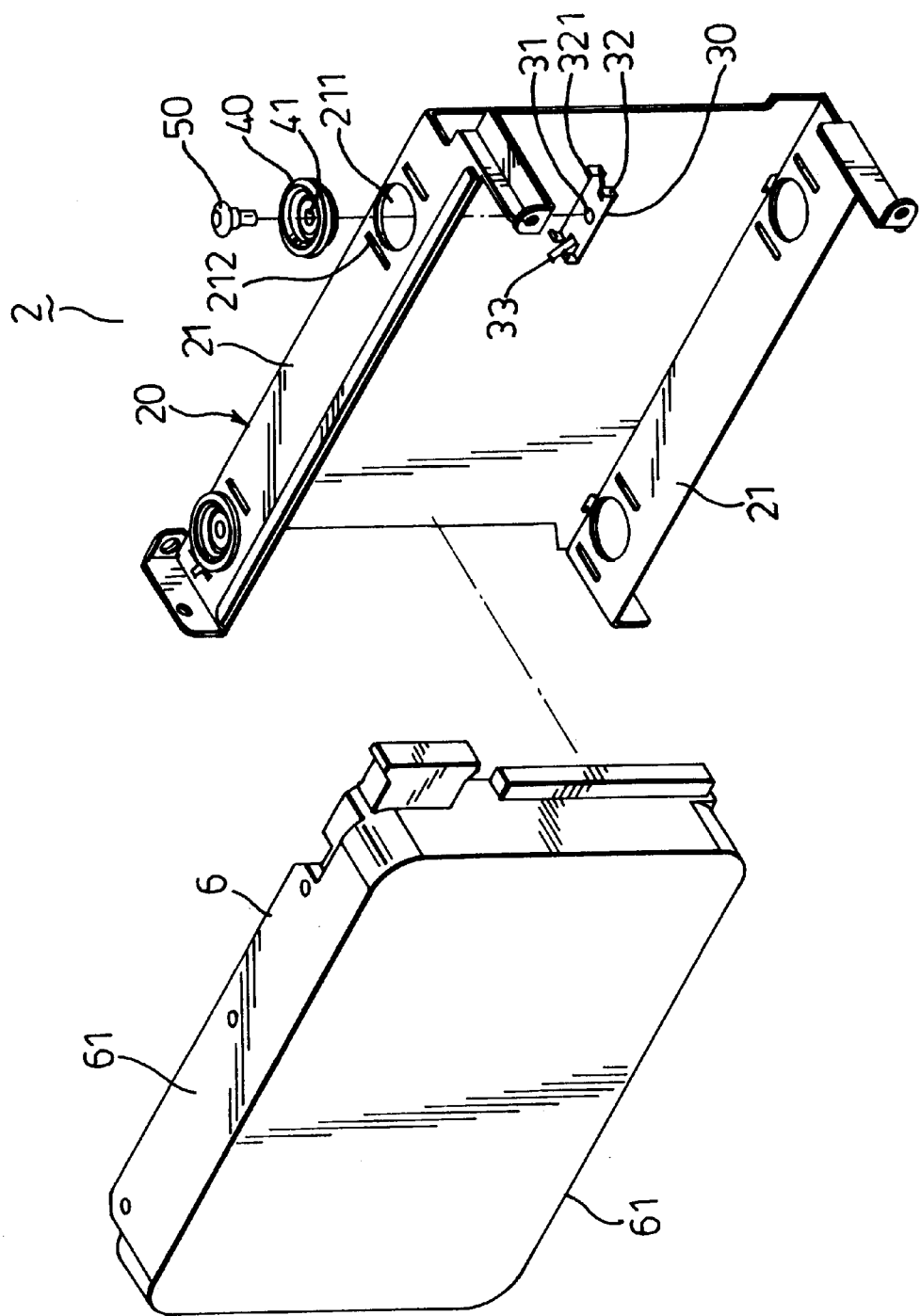
FIG. 2 is an exploded view of a preferred embodiment of the cushioning device of this invention.
Figure 3:
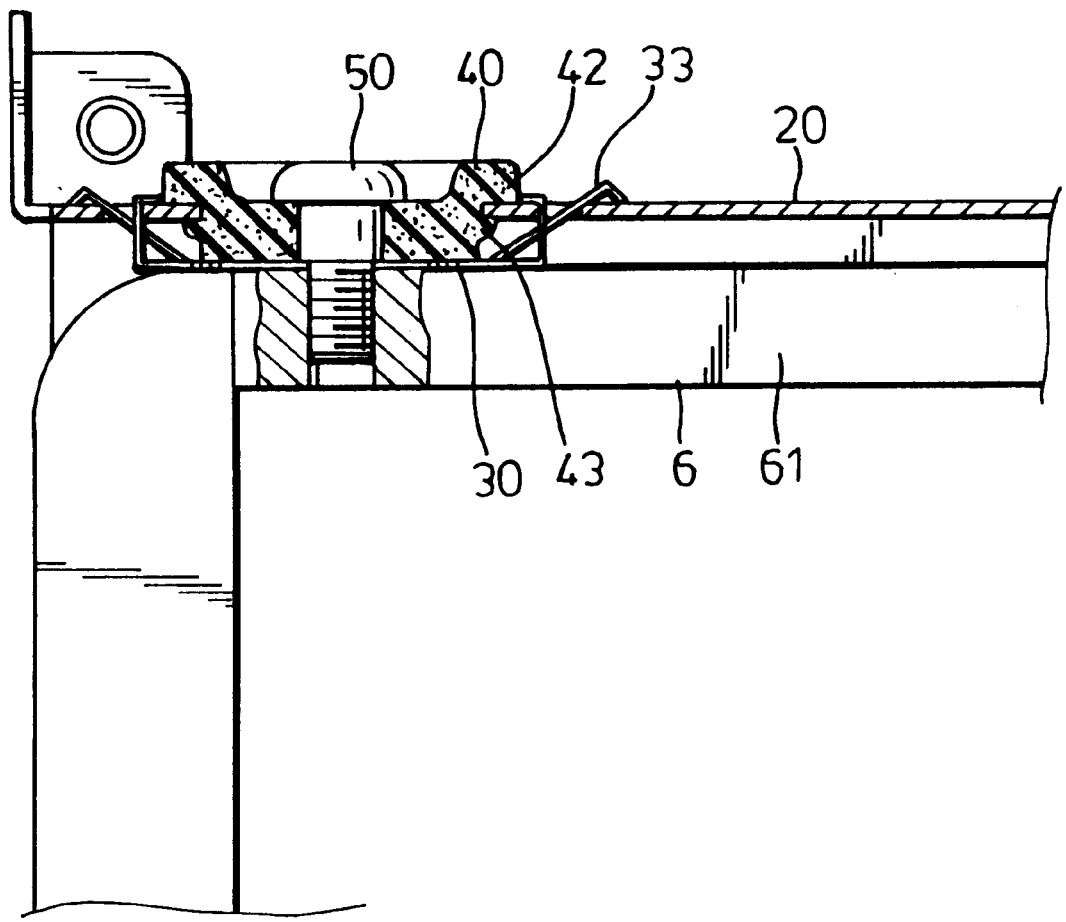
FIG. 3 is an assembled cross-sectional view of the preferred embodiment showing the deformation of an impact absorbing member thereof.

Referring to FIGS. 2 and 3, a preferred embodiment of a cushioning device 2 of this invention includes a support frame 20 which is adapted to be secured to a hard disk drive 6 of a computer and which has right and left anchoring walls 21. The right and left anchoring walls 21 are disposed to be spaced apart from each other in a longitudinal direction so as to be adapted to suspend the hard disk drive 6 therebetween with right and left side walls 61 of the hard disk drive 6 facing the right and left anchoring walls 21, respectively. In this embodiment, each of the right and left anchoring walls 21 has two inserting through holes 211 positioned adjacent to two opposing ends thereof. It should be noted that it is possible to provide only one of the right and left anchoring walls 21 with only one inserting through hole 211. Each of the inserting through holes 211 is defined by an outer annular engaging portion and an inner annular engaging portions which are disposed respectively on outer and inner surfaces of the corresponding one of the right and left anchoring walls 21. The outer and inner surfaces are opposite to each other in the longitudinal direction.

An impact absorbing member 40 made of an elastomeric material is provided for each of the inserting through holes 211. The impact absorbing member 40 has a bottom end adapted to abut against a respective one of the right and left side walls 61. A stem body is integrally formed with and extends from the bottom end in an axial direction parallel to the longitudinal direction. The stem body defines a fastening through hole 41 with a fastening axis in the axial direction. The impact absorbing member 40 is of such a dimension so as to be insertable into the inserting through hole 211 from the outer surface. The stem body has a circumferential wall about the fastening axis and extending in the axial direction. The impact absorbing member 40 has a first annular flange 42 and a second annular flange 43. The first annular flange 42 extends outwardly and radially from the circumferential wall at a first location distal to the bottom end. The second annular flange 43 extends outwardly and radially from the circumferential wall at a second location proximate to, and spaced apart from the first annular flange 42. The first and second annular flanges 42, 43 form an annular groove therebetween. The second annular flange 43 is smaller than the first annular flange 42 in radial dimension such that the second annular flange 43 can be forced through the inserting through hole 211 by deforming the impact absorbing member 40. The annular groove is disposed such that the first and second annular flanges 42,43 will abut respectively against the outer and inner annular engaging portions when the second annular flange 43 is inserted into the inserting through hole 211, thereby bringing the bottom end to be adapted to abut against the respective one of the right and left side walls 61.

A fastening member 50, such as a screw, is disposed to retainingly pass through the fastening through hole 41 and is adapted to be secured to the respective one of the right and left side walls 61 of the hard disk drive 6, thereby bringing the bottom end to abut against the respective one of the right and left side walls 61 in the longitudinal direction.

With this arrangement, the support frame 20 is not directly mounted onto the hard disk drive 6. But rather, the impact absorbing members 40 separate the right and left anchoring walls 21 from the respective one of the right and left side walls 61 of the hard disk drive 6. Therefore, any impact transmitted to the support frame 21 from outside the computer can be absorbed by the impact absorbing members 40, thereby protecting the hard disk drive 6.

Preferably, the cushioning device 2 is further provided with a retaining plate 30 that includes an intermediate portion and front and rear portions. The intermediate portion has a first side disposed to abut against the bottom end to resist extent of deformation of the stem body upon application of the external impact in the longitudinal direction, and a second side opposite to the first side in the longitudinal direction and adapted to engage the respective one of the right and left side walls 61. The front and rear portions flank the intermediate portion and are integrally formed therewith. The intermediate portion has a first through hole 31 disposed to be registered with the fastening through hole 41 for passage of the fastening member 50 therethrough.

The right and left anchoring walls 21 have front and rear slots 212 which are respectively communicated with the outer and inner surfaces. The front and rear slots 212 are disposed respectively at front and rear sites which are diametrical to each other relative to the inserting through hole 211 and which are radial and outward to either one of the outer and inner annular engaging portion to form front and rear anchored portions, respectively.

Each of the front and rear portions of the retaining plate 30 includes two slits extending in a first transverse direction and disposed to be spaced apart from each other in a second transverse direction which is transverse to both the first transverse direction and the longitudinal direction so as to form a middle strip 33 and two lateral strips 32 that flank the middle strip 33 in the second transverse direction. The two lateral strips 32 are bent towards the other one of the front and rear portions so as to cooperatively form a respective one of bent front and rear ends 321. The front and rear ends 321 are bent toward each other subsequent to insertion of the front and rear portions into the front and rear slots 212, respectively. The middle strip 33 is led through a respective one of the front and rear slots 212 from the inner surface to the outer surface and is subsequently bent away from the respective one of the bent front and rear ends 321 so as to form a finger end to be slidably retained on the upper surface, thereby increasing resiliency of the intermediate portion.

The bent front and rear ends 321 abut respectively against the front and rear anchored portions to urge the first side of the intermediate portion of the retaining plate 30 to abut against the bottom end of the impact absorbing member 40.

Because the intermediate portion of each of the retaining plates 30 resists the axial deformation of the respective one of the impact absorbing members 40, and because the inherent resiliency of the impact absorbing member 40, the intermediate portion of each of the retaining plates 30 and the respective impact absorbing member 40 cooperatively protect the hard disk drive 6 from damage in the event of an external impact applied on a computer.

Since the retaining plate 30 is made of a metal, the hard disk drive 6 is grounded via the retaining plate 30 and is prevented from damage due to static electricity that is often present in a hard disk drive assembly.

The advantages provided by the cushioning device of this invention are as follows.

1. The hard disk drive can be adequately protected from damage.

Since the anchoring walls of the support frame of the cushioning device are provided with impact absorbing members and retaining plates with superior resiliency, the hard disk drive is protected from direct impact and wear, thus reducing the likelihood of failure.

2. The manufacturing cost of the hard disk drive is lowered.

The provision of the less expensive impact absorbing members and retaining plates compensates for less strict manufacturing requirements of the hard disk drive, thus leading to lowering of the production cost.

It should be understood that the above description is intended to be illustrative and not restrictive. A variety of modifications will be apparent to those skilled in the art within the sprit and scope of the invention as defined in the appended claims.

I claim:

1. A cushioning device for shielding from an external impact a computer component which is to be secured relative to a base body of a computer, and which is provided with right and left side walls, said cushioning device comprising:

a support frame adapted to be secured to the base body, and including right and left anchoring walls disposed to be spaced apart from each other in a longitudinal direction so as to be adapted to suspend the computer component therebetween with the right and left side walls facing said right and left anchoring walls respectively, at least one of said right and left anchoring walls including outer and inner surfaces which are opposite to each other in said longitudinal direction, and which include outer and inner annular engaging portions respectively, said outer and inner annular engaging portions cooperatively defining an inserting through hole therein;

an impact absorbing member made of an elastomeric material, and including: a bottom end adapted to abut against a respective one of the right and left side walls; a stem body integrally formed with and extending from said bottom end in an axial direction parallel to said longitudinal direction, said stem body defining a fastening through hole with a fastening axis in said axial direction and being of such a dimension so as to be insertable into said inserting through hole from said outer surface, said stem body having a circumferential wall about said fastening axis and extending in said axial direction; a first annular flange extending outwardly and radially from said circumferential wall at a first location distal to said bottom end, and of a first radial dimension; and a second annular flange extending outwardly and radially from said circumferential wall at a second location proximate to, and space apart from said first annular flange so as to form an annular groove therebetween, said second annular flange being of a second radial dimension smaller than said first radial dimension, and such that said second annular flange can be forced though said inserting through hole by deforming said impact absorbing member, said annular groove being disposed such that said first and second annular flanges will about respectively against said outer and inner annular engaging portions when said second annular flange is inserted into said inserting through hole, thereby bringing said bottom end to be adapted to abut against the respective one of the right and left side walls;

a fastening member disposed to retainingly pass through said fastening through hole and adapted to be secured to the respective one of the right and left side walls to thereby bring said bottom end to abut against the respective one of the right and left side walls in said longitudinal direction; and a retaining plate which includes: an intermediate portion having a first side disposed to abut against said bottom end to resist extent of deformation of said stem body upon application of the external impact in said longitudinal direction, and a second side opposite to said first side in said longitudinal direction, and adapted to engage the respective one of the right and left side walls; and front and rear portions which flank and which are integrally formed with said intermediate portion, said front and rear portions being disposed to be secured to said at least one of said right and left anchoring walls at front and rear sites which are diametrical to each other relative to said inserting through hole and which are radial and outward to either one of said outer and inner annular engaging portions;

said right and left anchoring walls having front and rear slots which are respectively communicated with said outer and inner surfaces, which are disposed respectively at said front and rear sites, and which are spaced apart from said outer and inner annular engaging portions to form front and rear anchored portions, respectively;

said front and rear portions respectively including front and rear ends bent toward each other subsequent to insertion of said front and rear portions into said front and rear slots, respectively, so that said bent front and rear ends will abut respectively against said front and rear anchored portions to urge said first side to abut against said bottom end of said impact absorbing member;

each of said front and rear portions including two slits extending in a first transverse direction transverse to said longitudinal direction and disposed to be spaced apart from each other in a second transverse direction which is transverse to both said first transverse direction and said longitudinal direction so as to form a middle strip and two lateral strips that flank said middle strip in said second transverse direction, said two lateral strips being bent towards the other one of said front and rear portions so as to cooperatively form a respective one of said bent front and rear ends, said middle strip being led through a respective one of said front and rear slots from said inner surface to said outer surface and being subsequently bent away from said respective one of said bent front and rear ends so as to form a finger end to be slidably retained on said upper surface, thereby increasing resiliency of said intermediate portion.

2. A cushioning device according to claim 1, wherein said intermediate portion has a first through hole disposed to be registered with said fastening through hole for passage of said fastening member therethrough.

3. A cushioning device according to claim 1, wherein said retaining plate is made of metal.

* * * * *